(12) United States Patent
Lynch et al.

(10) Patent No.: US 7,762,078 B2
(45) Date of Patent: Jul. 27, 2010

(54) NOZZLE WITH TEMPERATURE-RESPONSIVE THROAT DIAMETER

(75) Inventors: Michael D. Lynch, Granite Bay, CA (US); Dustin C. Barr, Citrus Heights, CA (US)

(73) Assignee: Aerojet-General Corporation, Sacramento, CA (US)

( * ) Notice: Subject to any disclaimer, the term of this patent is extended or adjusted under 35 U.S.C. 154(b) by 759 days.

(21) Appl. No.: 11/531,630

(22) Filed: Sep. 13, 2006

(65) Prior Publication Data
US 2009/0173077 A1  Jul. 9, 2009

(51) Int. Cl.
F02K 1/00  (2006.01)
(52) U.S. Cl. .............. 60/771; 60/200.1; 239/265.19
(58) Field of Classification Search .............. 60/200.1, 60/771, 242, 770; 239/265.19, 265.37, 265.39
See application file for complete search history.

(56) References Cited

U.S. PATENT DOCUMENTS

| | | | |
|---|---|---|---|
| 2,303,992 A | | 12/1942 | Frazer et al. |
| 2,846,843 A | * | 8/1958 | Clark et al. ............ 60/242 |
| 2,909,032 A | | 10/1959 | Davies |
| 2,926,488 A | * | 3/1960 | Faught ............... 60/238 |
| 2,931,168 A | * | 4/1960 | Nordwald et al. ........ 60/238 |
| 2,979,889 A | * | 4/1961 | Middleton et al. ........ 60/242 |
| 3,080,709 A | * | 3/1963 | Rand ................. 60/237 |
| 3,143,293 A | | 8/1964 | Purse |
| 3,331,204 A | * | 7/1967 | Pender ............... 60/238 |
| 3,403,842 A | * | 10/1968 | Roche ................ 415/48 |
| 3,792,815 A | * | 2/1974 | Swavely et al. ...... 239/265.39 |
| 3,971,208 A | * | 7/1976 | Schwent .............. 60/773 |
| 4,060,979 A | * | 12/1977 | Elsaesser et al. ........ 60/773 |
| 4,109,867 A | * | 8/1978 | Ebeling, Jr. ......... 239/265.15 |
| 4,128,208 A | * | 12/1978 | Ryan et al. .......... 239/265.39 |
| 4,186,556 A | * | 2/1980 | Lowry et al. ............ 60/773 |
| 4,252,498 A | * | 2/1981 | Radcliffe et al. ......... 415/26 |
| 4,550,564 A | * | 11/1985 | Callahan et al. ....... 60/39.093 |
| 4,622,808 A | * | 11/1986 | Kenison et al. .......... 60/795 |
| 4,655,034 A | * | 4/1987 | Kenison et al. .......... 60/795 |
| 4,802,629 A | * | 2/1989 | Klees ............... 239/265.19 |
| 5,174,105 A | * | 12/1992 | Hines ................ 60/774 |
| 5,224,337 A | * | 7/1993 | Morishita et al. ........ 60/773 |

(Continued)

*Primary Examiner*—William H Rodriguez
(74) *Attorney, Agent, or Firm*—Townsend and Townsend and Crew LLP.; M. Henry Heines

(57) ABSTRACT

Nozzles that offer shape variability to maintain or purposely change the pressure drop across the throat are obtained by constructing the nozzles with components that change their shape, angle, or curvature in response to temperature changes that occur during the flow of combustion products through the nozzle. The temperature change may be the gradual heating of the nozzle wall from hot combustion gases, and the shape change may result in a decrease in the throat diameter or an expansion of the throat diameter. A decrease in throat diameter will be useful when the depletion of propellant as burning proceeds causes a drop in the pressure or flow rate of the combustion gas and there is a need to compensate for this drop to maintain the pressure drop across the throat. An increase in throat diameter will be useful when an initial high thrust is no longer needed and depletion of the fuel by itself is insufficient to lower the thrust to its desired reduced level. An example of a temperature-responsive material is a shape memory alloy; other examples are presented as well.

10 Claims, 7 Drawing Sheets

U.S. PATENT DOCUMENTS

| | | | |
|---|---|---|---|
| 5,281,087 A * | 1/1994 | Hines | 415/160 |
| 5,706,650 A * | 1/1998 | Thayer | 60/231 |
| 5,782,603 A * | 7/1998 | O'Brien et al. | 415/1 |
| 6,164,902 A * | 12/2000 | Irwin et al. | 415/17 |
| 6,318,070 B1 | 11/2001 | Rey et al. | |
| 6,513,333 B2 * | 2/2003 | Sugitani | 60/773 |
| 6,543,224 B1 * | 4/2003 | Barooah | 60/527 |
| 6,551,057 B1 * | 4/2003 | Haaser et al. | 415/119 |
| 6,681,560 B2 * | 1/2004 | Friedlander et al. | 60/228 |
| 6,701,717 B2 * | 3/2004 | Flatman et al. | 60/792 |
| 6,718,752 B2 * | 4/2004 | Nesbitt et al. | 60/204 |
| 6,735,936 B2 * | 5/2004 | Rey et al. | 60/226.3 |
| 6,820,429 B2 * | 11/2004 | Meisner | 60/773 |
| 6,993,914 B2 * | 2/2006 | Prouteau et al. | 60/771 |
| 7,000,378 B2 * | 2/2006 | Birch et al. | 60/226.1 |
| 7,007,483 B2 * | 3/2006 | Peters | 60/771 |
| 7,093,423 B2 | 8/2006 | Gowda et al. | |
| 7,458,221 B1 * | 12/2008 | Arnold et al. | 60/771 |
| 7,568,348 B2 * | 8/2009 | McAllister et al. | 60/771 |
| 2001/0045088 A1 * | 11/2001 | Sugitani | 60/39.02 |
| 2005/0274103 A1 * | 12/2005 | Prasad et al. | 60/226.1 |
| 2007/0256419 A1 * | 11/2007 | Baker et al. | 60/771 |

* cited by examiner

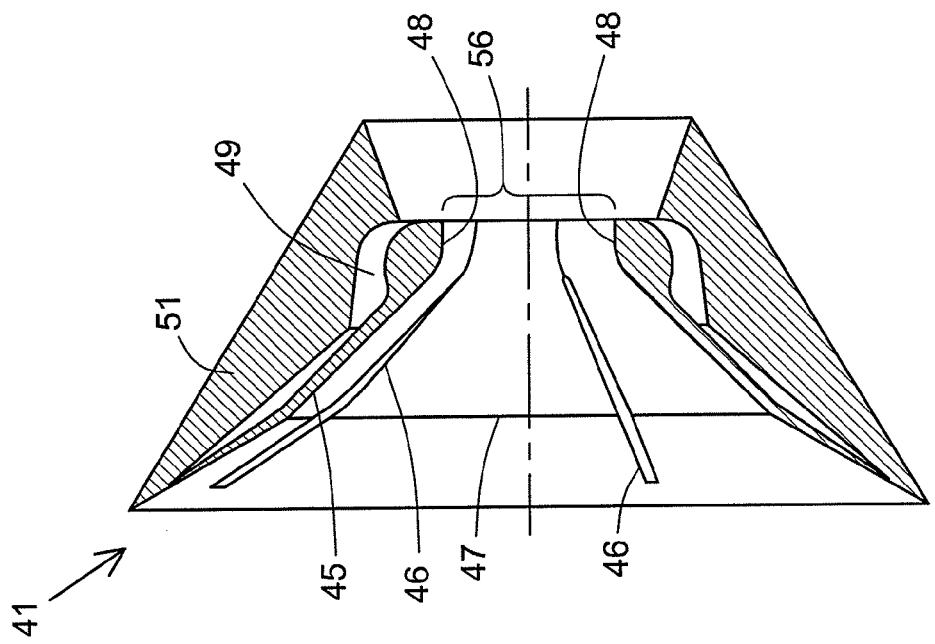
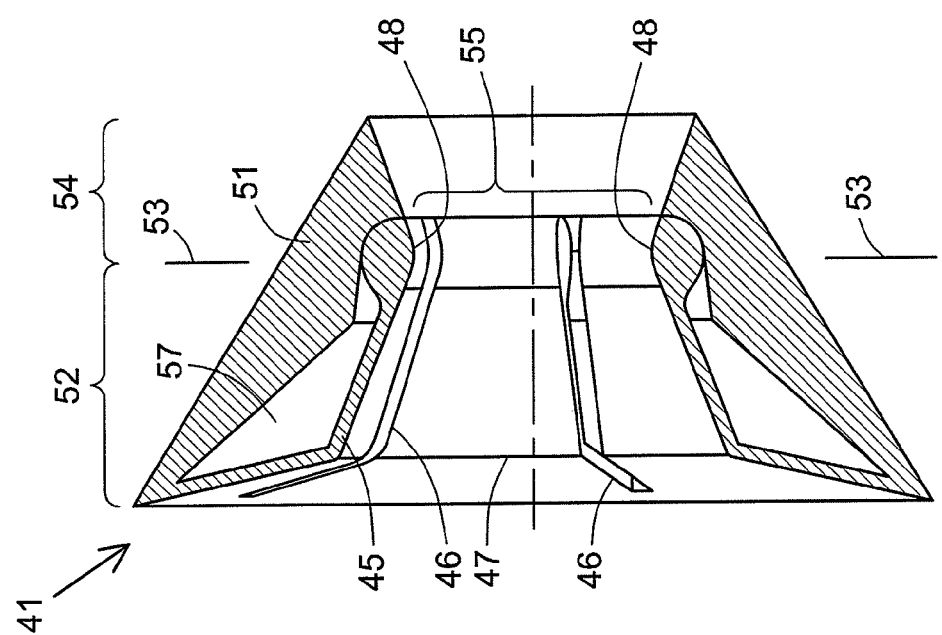
Fig. 6a
Fig. 6b

NOZZLE WITH TEMPERATURE-RESPONSIVE THROAT DIAMETER

BACKGROUND OF THE INVENTION

1. Field of the Invention

This invention resides in the field of propulsion systems, and in particular to nozzles that can be manipulated or transformed during use to accommodate changes encountered in either the propulsion system or the environment.

2. Description of the Prior Art

The thrust produced by a rocket motor tends to change with changes in altitude, environmental conditions, propellant mass flow, and propellant burning rate, and can vary as burning progresses. This affects the performance of the motor and of the vehicle driven by the motor, as well as the effectiveness of the vehicle in performing its mission. In some cases, this change in thrust is detrimental to rocket performance, while in others, a change in thrust is desired but may not be achieved spontaneously to the degree that is needed or at the point in time where the change is needed. To illustrate, as propellant supply is gradually depleted, the rate at which combustion gases are generated can decrease, causing a drop in chamber pressure. If this drop occurs during the boost phase of a rocket or at any time when a prolonged period of high-level thrust is needed, the efficiency of the rocket performance will suffer. On the other hand, a decrease in thrust is beneficial in rocket-powered launch vehicles that require high thrust at takeoff due to the large amount of unburnt propellant initially present in the vehicle. This is particularly true for vehicles that are launched from the earth's surface but whose primary mission is performed at high altitude where the external pressure is often at high vacuum. The primary mission often requires a high specific impulse ($I_{sp}$), i.e., a high ratio of thrust to the weight of fuel consumed in a unit of time, which is most readily achieved with a high area ratio, i.e., a high ratio of the area at the nozzle exit to the area at the throat. Nozzles with high area ratios tend to produce relatively low thrust at sea level, however, because of a reverse pressure differential near the nozzle exit that occurs when the wall pressure is below ambient pressure. In supersonic nozzles, one of the most important factors in controlling and maintaining thrust is the nozzle throat, since the pressure drop across the throat directly affects thrust as well as factors contributing to the thrust, such as the chamber pressure.

Numerous constructions have been developed in the history of rocket design for nozzles whose thrust can be varied during flight. Attempts to correct for reverse pressure differentials, for example, have been made by designing nozzles whose nozzle exit area is reduced for launch and then gradually increased during ascent. Nozzles have thus been designed with mechanically adjustable contours, area ratios and lengths. Mechanical features add complexity and weight to the engine construction, however, and many of these nozzles still produce less thrust at sea level than at vacuum. Other methods have included the use of combination-type engines using different propellants at different stages. Kerosene-fueled engines have thus been combined with engines derived from the Space Shuttle Main Engine (SSME) or with hydrogen-fueled engines such as the Russian RD-701 engine. Other examples of combination-type engines are the dual-fuel-dual-expander engine of Beichel, R., U.S. Pat. No. 4,220,001 (issued Sep. 2, 1980), and the dual-thrust rocket motor of Bornstein, L., U.S. Pat. No. 4,137,286 (issued Jan. 30, 1979) and U.S. Pat. No. 4,223,606 (issued Sep. 23, 1980). The Beichel engine requires a complex nozzle design that incorporates two thrust chambers, while the Bornstein motor achieves dual thrust by using separate sustainer and booster propellant grains in the combustion chamber, together with an igniter and squib that are inserted into the grain itself. Thrust variation has also been achieved by the introduction of secondary combustion gas near the wall of the divergent section of a nozzle, as described by Bulman, M., in U.S. Pat. No. 6,568,171 (issued May 27, 2003).

A still further means of achieving thrust variation is the use of a pintle for varying the effective area of the throat. A pintle is either a tapered or flared body that resides inside the nozzle and is movable along the nozzle axis, partially obstructing the throat and forcing the combustion gas to flow in the annular space between the pintle and the throat wall. With its tapered or flared profile, movement of the pintle by a small distance causes a significant change in the cross section area of the annular space and hence the effective throat area. In a solid propellant system, as burning progresses and the propellant supply rate is reduced, the pintle can be moved in a direction that will reduce the effective throat area in order to maintain combustion efficiency by increasing the pressure in the combustion chamber, although at a lower thrust. Movement of a pintle can be achieved by a hydraulic drive or a gear drive, among other methods. While a pintle offers versatility by allowing wide variation in the effective throat area and can be moved at will or programmed to move in either direction at any stage of the rocket propulsion, the inclusion of a pintle adds to the expense and weight of the nozzle and the rocket motor as a whole.

Of further potential relevance to this invention, although not known for use in nozzle construction, is the state of the art of shape-memory alloys, which are alloys that when formed into articles cause the articles to change shape upon a temperature change through a transition temperature. The transition temperature varies with the alloy composition, and the change in shape is produced by a crystallographic transformation, most notably the transition to and from a martensitic structure with the corresponding growth or disappearance of martensitic plates. Disclosures of shape memory alloys and the shape memory effect are found in Fonda, R. W., et al., "Crystallography and microstructure of TaRu," *Philosophical Magazine A*, 76(1): 119-133 (1997); Fonda, R. W., et al., "The Shape Memory Effect in Equiatomic TaRu and NbRu Alloys," *Scripta Materialia*, 39(8): 1031-1037 (1998); and Fonda, R., et al., U.S. Pat. No. 6,010,584 (issued Jan. 4, 2000). The contents of these documents and all others cited in this specification are incorporated herein by reference.

SUMMARY OF THE INVENTION

The present invention resides in nozzles whose internal profiles change in response to changes in temperature, the changing profile being useful for achieving either thrust maintenance or forced variations in thrust during the flight of a vehicle. The invention can thus provide thrust maintenance in cases where thrust would otherwise tend to diminish as propellant burning progresses, and thrust variation in cases where the needs of the engine differ at different stages of flight, a notable example being the sustain stage vs. the boost stage. The temperature responsivity of the nozzle profile is achieved by constructing the nozzle or parts of the nozzle with one or more materials that have properties that vary with temperature, either reversibly or irreversibly. Useful properties for this purpose are flexural strength (also termed bending strength and often expressed as modulus), compressive strength, crystallographic phase (as in the shape memory effect of certain metal alloys), physical phase (solid vs. liquid), and density. These properties can be present individually or in combination in the nozzle materials. The change in profile can for example be produced by a change in contour of one or more interior surfaces of the nozzle, due to a change in shape of an insert residing in the nozzle interior or of a lining on the nozzle wall. Such a change in contour can occur within the insert or lining itself, or it can be enhanced or driven by a support material under the insert or lining. The support material can be a beam or rib serving as a structural member or a sublining, and the change in the support material can occur either independently of or in conjunction with the pressure in the chamber itself, i.e., the pressure in the center of the nozzle. Any of these changes, either individually or in combination, can be used to decrease the throat diameter as the temperature of the nozzle rises due to exposure to hot combustion gases, thereby maintaining a high chamber pressure, with continued high combustion efficiency during the transition into, and throughout, the sustain phase.

The manner in which these and other embodiments, aspects, and objects of the invention are implemented will be apparent from the description that follows.

BRIEF DESCRIPTION OF THE DRAWINGS

FIGS. 6a and 6b are cross section views, both taken along the line 6-6 of FIG. 5, showing the nozzle at two different temperatures.

DETAILED DESCRIPTION OF THE INVENTION AND SPECIFIC EMBODIMENTS

Figure 1:
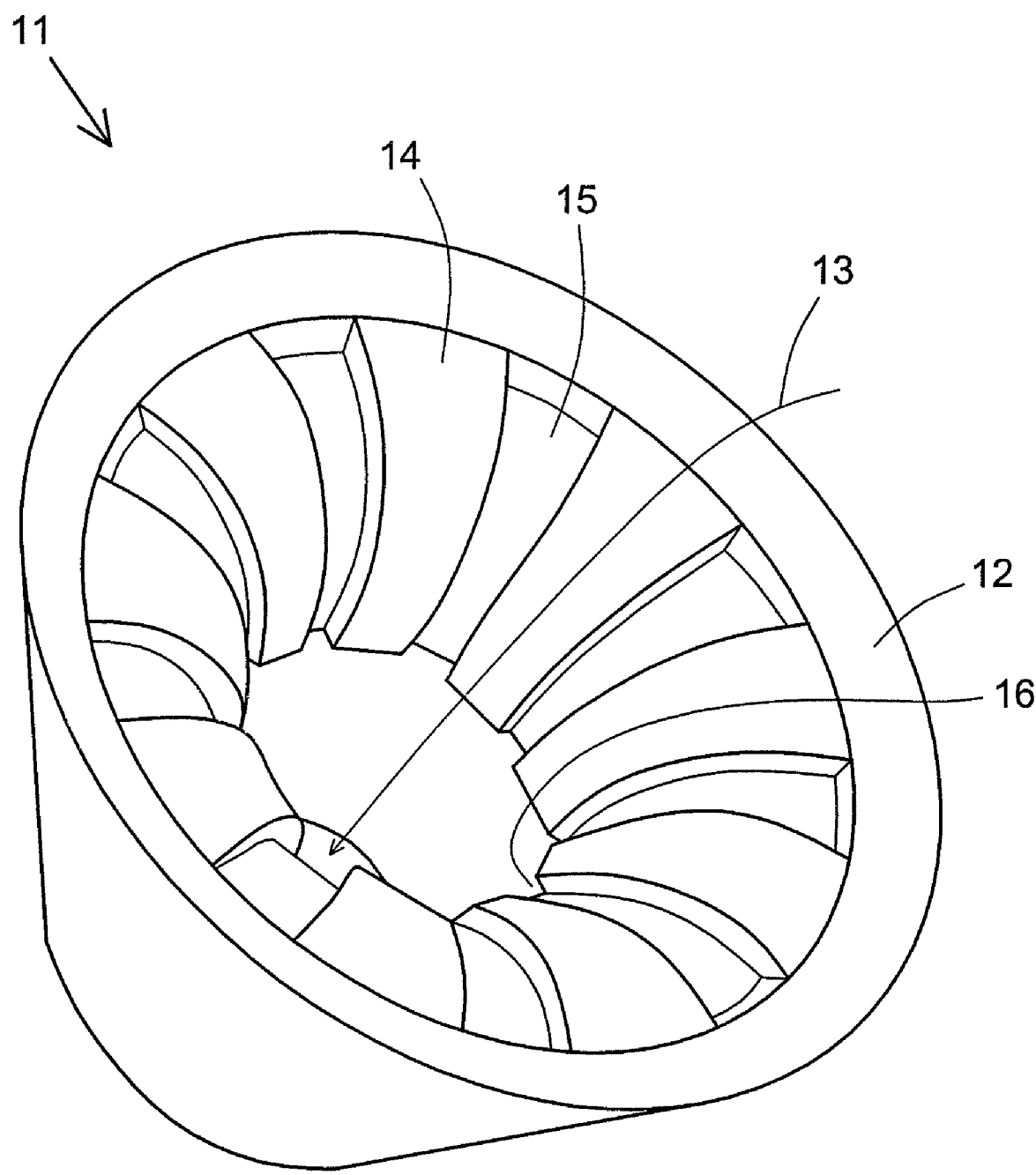
FIG. 1 is a perspective view of one example of a nozzle in accordance with the present invention.

Nozzles used in propulsion systems that are powered by combustible propellants are often constructed of refractory materials, and the tendency of refractory materials to undergo a reduction in strength and stiffness with increasing temperature is a feature used to beneficial effect in certain embodiments of the present invention. Portions of the nozzle, such as panels mounted to the nozzle wall or structural members supporting the panels, can be fabricated of materials that display this behavior at the desired temperature. In certain embodiments of this invention, these structural components can be shaped such that the lowering of their rigidity at high temperature causes them to deform under the nozzle pressure in such a manner that will change the nozzle profile. A nozzle wall panel, for example, with a curve or bend in its contour, or a structural member supporting such a panel, can be constructed such that once the strength and stiffness of the panel or structural member are lowered the pressure of the gas in the nozzle causes the panel to partially flatten. In a curved panel, this can result in an increase in the radius of curvature, and in a bent panel the result can be a decrease in the angle of the bend. The increase in the radius of curvature or the decrease in the bend angle can cause the panel to lengthen and extend into the throat or cause a section of the panel to protrude radially within the throat plane toward the nozzle axis. In either case, the throat area will be reduced. Reductions in strength and stiffness can also be a useful feature at the location where the panel is joined to an outer shell or base that may be part of the nozzle construction. The joint will thus be a thermal joint that undergoes a loss of rigidity as the temperature rises, allowing the pressure within the nozzle to change the angle between the panel and the shell, the joint thereby permitting the panel to deform in response to the nozzle pressure. In all of these examples, the resistance of the refractory material to permanent deflection decreases with increasing temperature. Examples of refractory materials for which this quality can be used to beneficial effect in the present invention are molybdenum TZM (an alloy of molybdenum that contains small amounts of titanium and zirconium), tungsten, rhenium, rhenium-molybdenum, and tungsten-rhenium.

Alloys displaying a shape memory effect can be used in place of or in combination with thermal joints or other components that deform as a result of a reduction in strength or stiffness. The crystallographic transformation that causes a component made from a shape memory alloy to change its shape is in many cases a thermoelastic martensitic transformation arising from the preferential stability of a martensitic crystal structure below a certain transition temperature and the preferential stability of an alternate crystal structure such as an austenitic structure above the transition temperature. As the temperature of the alloy rises above the transition temperature, therefore, martensite plates present in the alloy microstructure reduce in size and ultimately disappear as they are replaced by austenite grains, and as the temperature returns to points below the transition temperature, the martensite plates re-form and grow. With the growth and disappearance of the martensitic plates, mechanical stresses are imposed on the component, causing the component to adopt a curved shape or to increase or decrease its curvature. With appropriate mechanical and thermal treatments of the component in ways known in the art, the change in shape can either be reversible or irreversible. Reversible transformations are preferred in the practice of this invention, allowing the nozzle, of which the shape memory component can be a panel or a supporting structural member, to undergo repeated temperature cycles with the same profile change occurring in each cycle. Such a nozzle can be used for multiple cycles and has a relatively long life.

Panels formed from shape memory alloys can be configured to undergo either an increase or decrease in curvature, as required by the nozzle construction, expanding or reducing the throat diameter as desired. As is well known in the art, the transition temperature of a shape memory alloy varies with the alloy composition, and the inclusion of certain alloying elements is known to increase the transition temperature while others are known to decrease the transition temperature. Alloying elements that tend to increase the transition temperature are aluminum, zirconium, hafnium, platinum, and palladium. Platinum and palladium are particularly effective in increasing the transition temperature of shape memory alloys that contain nickel and titanium. Platinum can increase the transition temperature to over 1,000° C. (1,832° F.). Further alloys that have high transition temperatures are tantalum-ruthenium alloys and niobium-ruthenium alloys. Disclosures of these alloys appear in Fonda, R., et al., U.S. Pat. No. 6,010,584, cited above.

Nozzles of the present invention are generally convergent-divergent supersonic nozzles, the convergent and divergent sections meeting at a throat or a throat plane. The fore and aft ends of the nozzle are defined by the direction of propulsion, which is opposite to the direction of gas flow through the nozzle, the fore end being at the entrance plane to the convergent section and the aft end at the exit plane of the divergent section. Nozzle profile changes are achieved by changes in the contours of the interior surfaces of the nozzle wall. These surfaces are either those of the nozzle itself or of panels inside the nozzle that traverse or abut the throat plane. To accommodate the change in contour of the surfaces and hence the change in throat diameter, the surfaces can be those of adjacent panels that are either separated by gaps, arranged in an overlapping configuration, or separated by segments that distort more readily and are contiguous with the panels.

In preferred constructions, the nozzle is constructed as a shell with panels mounted to the shell through deformable mountings. As noted above, these mountings can be thermal joints whose reduction in strength and stiffness at high temperature allows the panels to move. Alternatively, pivotal mountings can be used. In certain embodiments, the panels extend from the fore end of the convergent section to terminate at the throat plane or a short distance downstream of the throat plane. The region between the panels and the shell can be a void or can be occupied by support structures or materials whose response to temperature changes contributes to the changes in the panel contours. As noted above, one type of support structure is a solid material that fills the region between the panels and the shell and that changes state to a liquid or gas above a particular temperature. Thus liquefied or gasified, the material removes its support of the panel and allows the panel to deform, such as by flattening, under pressure from the gas in the nozzle. Conversion to a liquid or gas may simply cause the material to redistribute in the space between the panels and the shell or to escape around the panel edges and out of the nozzle with the flowing gas. Examples of materials that provide solid support at ambient temperature and liquefy and/or gasify in the temperature range typically encountered in a supersonic nozzle are rose metal (a fusible alloy consisting of 50% Bi, 25-28% Pb, and 22-25% Sn), woods metal (a fusible alloy consisting of 50% Bi, 25% Pb, 12.5% Sn, and 12.5% Cd), and other low-temperature eutectics, as well as thermoplastic and thermoset polymers. Materials that sublime upon the expected increase in temperature, which materials are also known to those skilled in the art, will be effective by removing the support that they provide to the panels when solid or by first expanding to exert enough pressure on the panels to cause the panels to deform, and then escaping. As also noted above, another type of support structure is a solid material that expands with the increase in temperature while remaining solid. Many metals exhibit this behavior in a manner useful to this invention, as do polymers and composites that consist of a polymeric or metallic matrix filled with a solid reinforcing material. In still other embodiments of this invention, the support structures are brackets, ribs, or the like that, upon heating above the transition temperature, undergo a reduction in strength and stiffness, or a change in shape due to a shape memory effect, and once having done so allow the panel or surface to deform in response to the nozzle pressure.

The temperature and time at which the change in nozzle profile is needed will vary with the propulsion system, and particularly with such parameters as the chemical composition of the propellant, the volumetric capacity of the engine and the nozzle, and the levels of thrust. The choice of temperature-responsive material that induces the profile change, whether the material be a shape memory alloy, a liquefiable or gasifiable polymer, a thermally expanding material, a material with variable flexural or compressive strength and stiffness, or a combination of such materials, can be governed by the desired transition temperature and the timing of the transition element. In some systems, however, it will be possible to select a propellant of a particular chemical composition to accommodate a particular temperature-responsive material, i.e., a propellant that reaches a particular temperature at a particular stage in the combustion or extent of propellant depletion. In either case, the profile transition in most applications of this invention will occur at a temperature in the range of about 500° F. (approximately 260° C.) to about 6,000° F. (approximately 3,320° C.), preferably about 1,000° F. (approximately 540° C.) to about 2,500° F. (approximately 1,650° C.). Although the heating of the constituent nozzle parts and resulting nozzle profile change are driven by the combustion temperature of the propellant, the transition temperature will always be below the combustion temperature of the propellant.

While this invention is capable of a large number of implementations and embodiments varying both in configuration and mode of operation, an understanding of the features that define the novel and inventive character of the invention and that are common to all such implementations and embodiments can be had by a detailed review of specific examples. Four such examples are shown in the Figures.

The first example is illustrated in FIGS. 1, 2, 3a, and 3b. FIG. 1 is a perspective view of a convergent-divergent nozzle 11 showing the fore end 12 of the nozzle at the inlet plane to the convergent section and the nozzle interior. The direction of fluid flow through the nozzle is indicated by the arrow 13, and is opposite to the direction of thrust. The inner wall of the convergent section is lined with a series of panels, including both upper panels 14 alternating with and overlapping lower panels 15. All of the panels are curved in a convex curvature, and extend from the convergent section inlet 12 to the throat 16.

Figure 2:
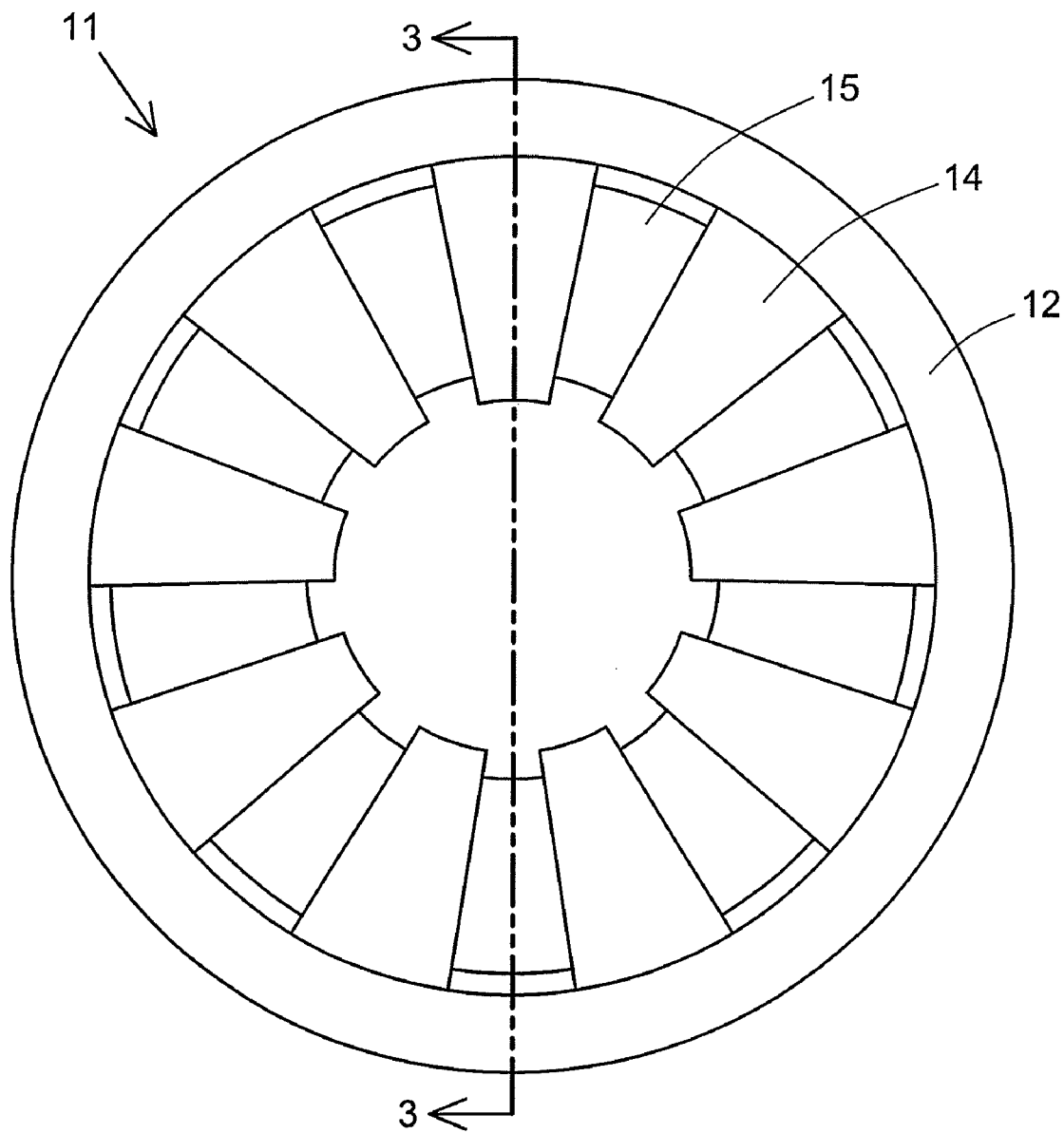
FIG. 2 is an end view of the nozzle of FIG. 1, looking aft.
Figure 3B:
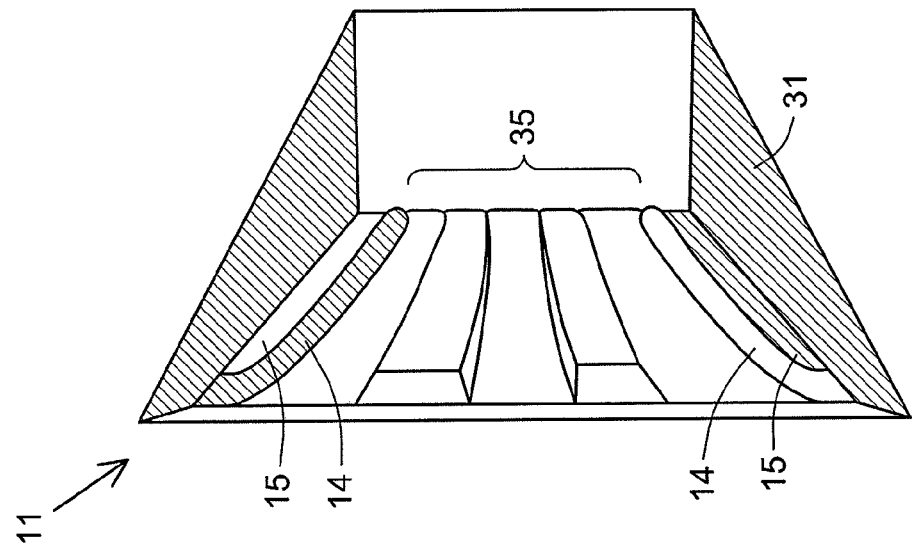
FIGS. 3a and 3b are cross section views, both taken along the line 3-3 of FIG. 2, showing the nozzle at two different temperatures.
Figure 3A:
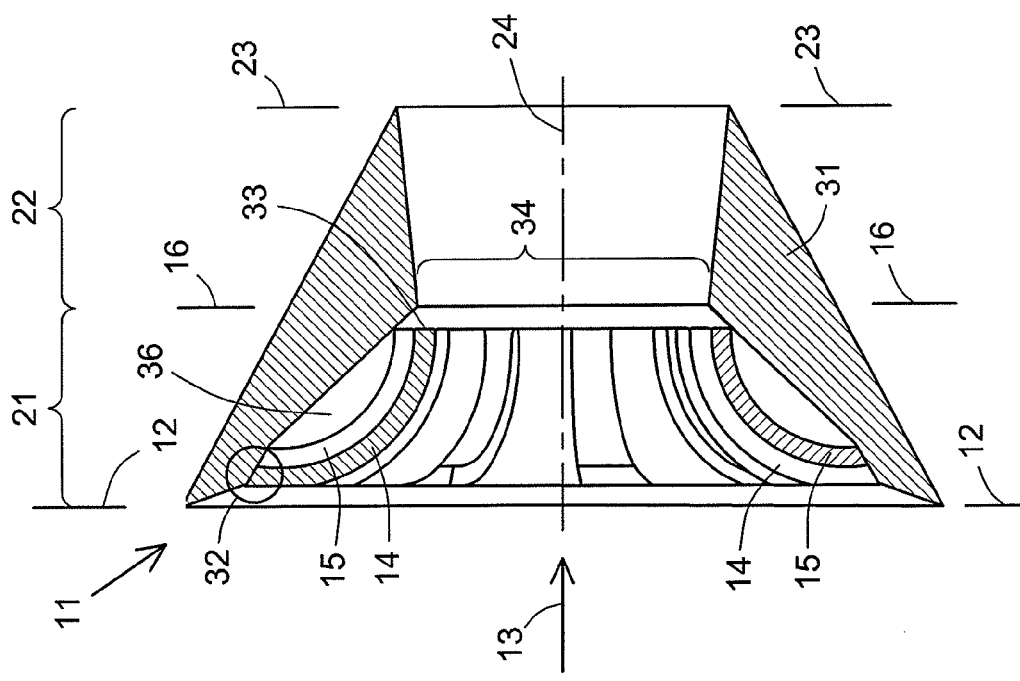

The arrangement of the upper and lower panels 14, 15 is also seen in the end view of FIG. 2, and the curvature of the panels as well as the structure of the nozzle itself 11 is visible in the cross section view of FIG. 3a. FIG. 3a shows the convergent section 21, throat plane 16, and divergent section 22 of the nozzle, and the direction of flow 13 from the fore (inlet) end 12 of the nozzle to the aft (outlet) end 23. Aside from the overlapping panels 14, 15, the nozzle 11 is a body of revolution about an axis 24.

The nozzle construction includes an outer shell 31 to which the panels 14, 15 are mounted. The panels are joined to the shell 31 at points near the inlet plane 12 by thermal joints 32 whose rigidity lowers with increasing temperature. The downstream ends 33 of the panels are floating, i.e., not joined to the shell 31 but instead free to move relative to the shell. The downstream ends of the lower panels 15, while floating, are in contact with the shell surface, while there is a slight gap between the downstream ends of the upper panels 14.

Both sets of panels 14, 15 in this embodiment are formed of a shape memory alloy and have been treated and constructed to assume the curved shape shown in FIG. 3a at ambient temperature and temperatures in general below the transition temperature. With this curved shape, the downstream ends of the panels collectively form a throat of a particular cross section 34. As the panels rise in temperature past the transition temperature, they undergo a change in shape, in this case to one of a lesser curvature by increasing the radius of curvature. With this loss of curvature and the softening of the thermal joints 32 that occurs with the same rise in temperature, the panels 14, 15 are pressed closer to the shell 31 by the pressure of the fluid passing through the nozzle. This causes the panels to extend toward and enter the throat plane 16 to achieve the configuration shown in FIG. 3b. This reduces the effective throat diameter, resulting in the smaller cross sectional area 35 shown in FIG. 3b. The change is accommodated by an increase in the degree of overlap between the upper panels 14 and lower panels 15 at their downstream ends 33.

At early stages of the fuel combustion the combustion gas passes through the nozzle at high pressure, and the curvature of the panels can be maintained against this pressure by a solid support material occupying the cavity 36 (FIG. 3a) between the panels 14, 15 and the shell 31. As noted above, however, the support material can be one that liquefies as the temperature rises above the transition temperature. The liquefied material is flowable and thereby capable of flowing through the small gaps between the downstream ends 33 of the upper panels 14 and the nozzle shell 31, and out of the cavity. This permits both the upper and lower panels to lie closer to the shell and their downstream ends to extend further into the throat.

Figure 4:
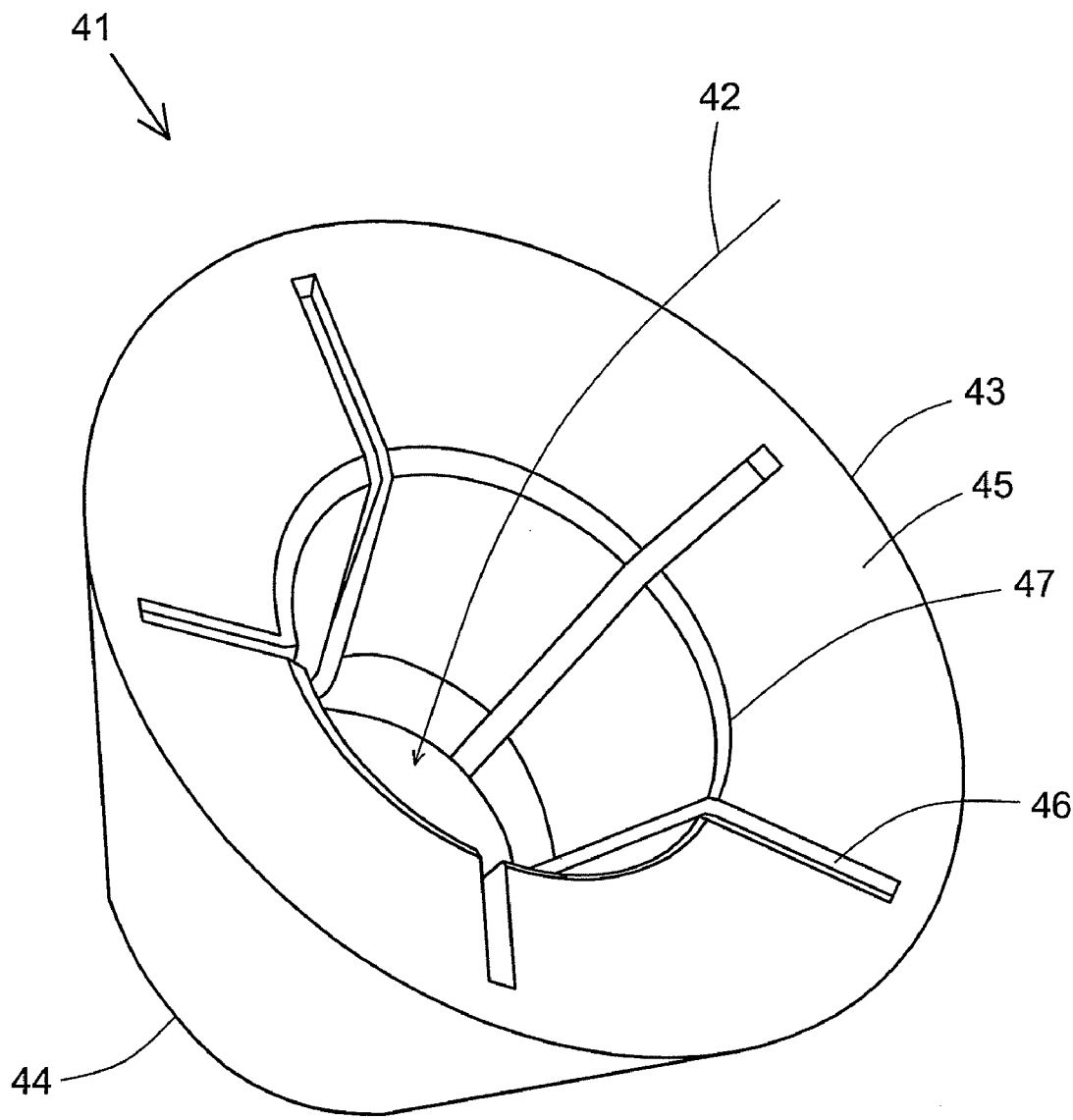
FIG. 4 is a perspective view of a second example of a nozzle in accordance with the present invention.
Figure 5:
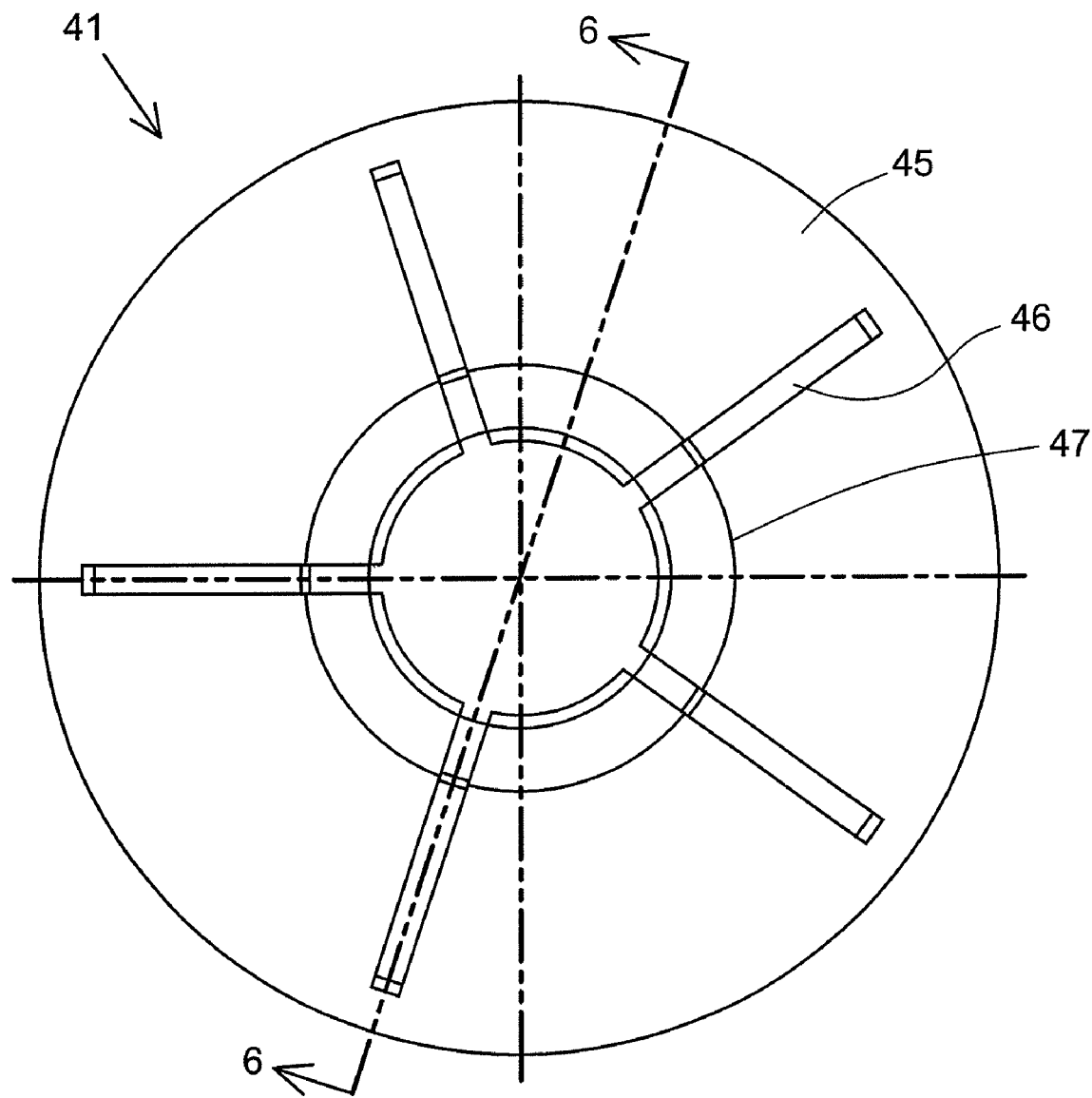
FIG. 5 is an end view of the nozzle of FIG. 4, looking aft.

The second example is illustrated in FIGS. 4, 5, 6a, and 6b. The perspective view of FIG. 4 illustrates a convergent-divergent nozzle 41 with the direction 42 of flow extending from the fore or inlet end 43 of the convergent section to the aft or outlet end 44 of the divergent section. FIG. 5 is an end view from the fore end 43. As in the example of FIGS. 1 through 3b, the inner surface of the convergent section is formed by a series of panels 45. In this example, the panels do not overlap but are separated by narrow gaps 46 to accommodate their movement.

Two views of a cross section of the nozzle along the line 6-6 of FIG. 5 appear in FIGS. 6a and 6b. Here, as in the example of example of FIGS. 1 through 3b, the nozzle is formed as a shell 51 to which the panels 45 are mounted, and the nozzle forms a convergent section 52, a throat plane 53, and a divergent section 54.

The panels 45 in the example of FIGS. 4, 5, 6a, and 6b are not curved as are the panels in the example of FIGS. 1, 2, 3a, and 3b, but instead are bent at a flexure line 47. As in example of FIGS. 1, 2, 3a, and 3b, the downstream ends 48 of the panels in this second example define the throat, but the downstream ends 48 rest within a depression 49 in the shell that allows pivotal movement of the ends. As the temperature of the nozzle materials increases, the panels 45 shift toward a flattened configuration, reducing the angle of the flexure line 47 and drawing the panels sections closer to the shell 51, and forcing the downstream panel ends 48 to move toward each other, thereby reducing the throat diameter from an initial diameter 55 (FIG. 6a) to a reduced diameter 56 (FIG. 6b). With this movement, the gaps 46 between adjacent panels close as the angle at the flexure line 47 decreases. As in the example of FIGS. 1, 2, 3a, and 3b, the initial bent shape of the panels (FIG. 6a) can be supported by a solid material residing in the cavity 57 between the panels and the shell, and then made releasable by liquefaction of the support material and escape of the liquefied material through the gaps 46 or past the downstream ends 48 of the panels.

Figure 7:
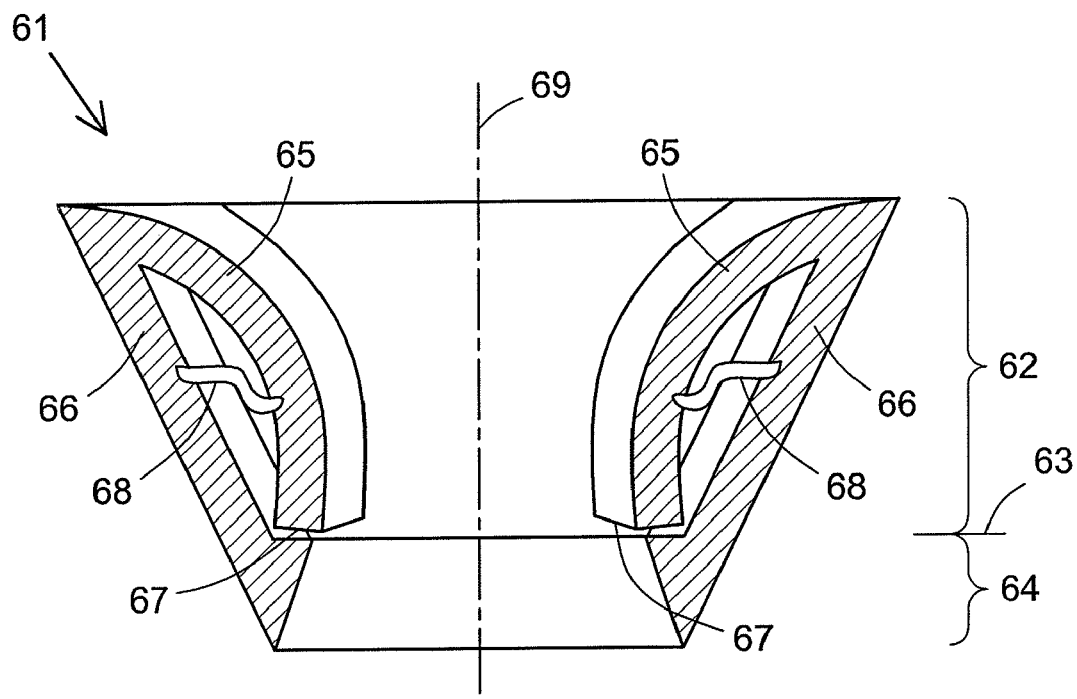
FIG. 7 is a cross section of a third example of a nozzle in accordance with the present invention.

The third example is shown in cross section in FIG. 7. Like the nozzles in the preceding figures, the nozzle 61 of FIG. 7 has a convergent section 62, and throat plane 63, and a divergent section 64, with curved panels 65 on the inner surface of the convergent section 62 and extending into the throat plane 63. The panels are mounted to a shell 66 at the inlet end of the convergent section and the downstream ends 67 of the panels float, allowing them to move toward or away from the axis of the nozzle as the curvature of the panels changes. The position of each panel is controlled by a supporting rib or spring 68 residing in the cavity between the shell and the panel, one end of the spring embedded in the shell and the other end in the panel. The spring 68 is formed from a shape memory alloy that causes the spring to extend at temperatures elevated above the transition temperature, pushing the panel 65 outward (toward the nozzle axis 69) to reduce the diameter of the throat, and to retract to the position shown in the Figure as the temperature returns to and falls below the transition temperature.

Figure 8:
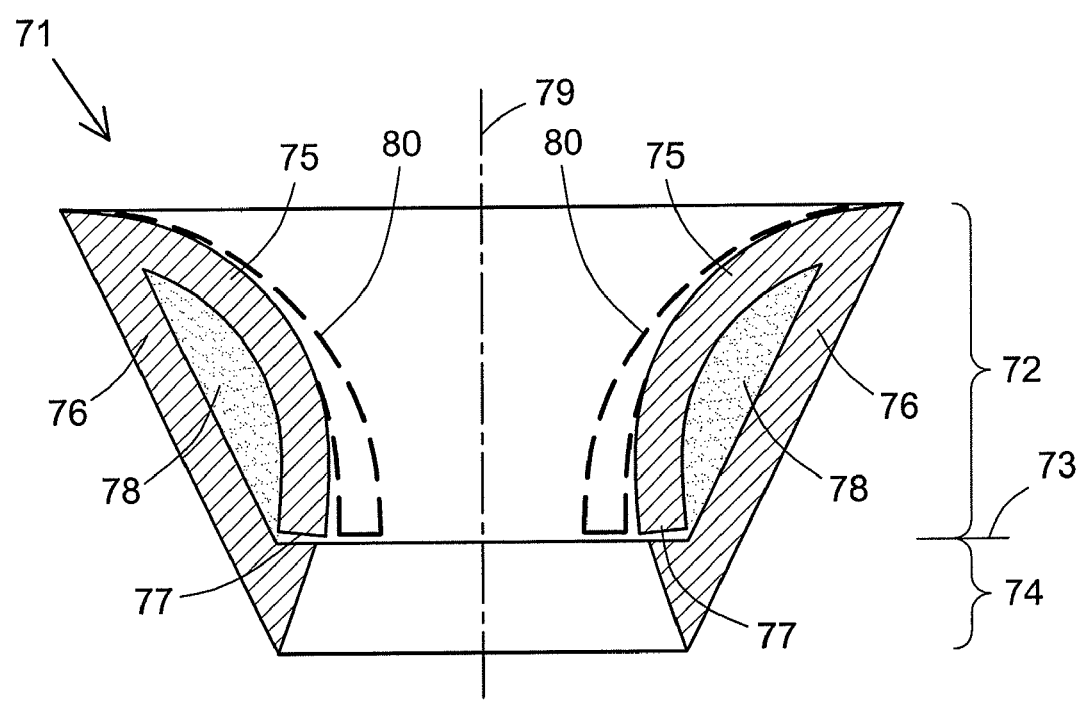
FIG. 8 is a cross section of a fourth example of a nozzle in accordance with the present invention.

The fourth example is shown in cross section in FIG. 8. Like the nozzles in the preceding figures, the nozzle 71 of FIG. 8 has a convergent section 72, and throat plane 73, and a divergent section 74, with curved panels 75 on the inner surface of the convergent section 72 and extending into the throat plane 73. The panels are mounted to a shell 76 at the inlet end of the convergent section, and the downstream end 77 of each panel floats, allowing each panel to move toward or away from the axis of the nozzle as the curvature of the panel changes. Between the panels 75 and the shell 76 is a potting material 78 that remains solid over the range of temperatures encountered by the nozzle, but expands with increasing temperature. Expansion of the potting material causes the material to force the panels 75 inward toward the nozzle axis 79, as shown by the dashed lines 80, decreasing the diameter of the throat.

As noted above, many of the configurations shown in these Figures can be designed to operate in reverse, increasing rather than decreasing the throat diameter with rising temperature. When the shape or orientation of a panel is controlled by a shape memory alloy, the part formed from the alloy can be fabricated or arranged in the nozzle to cause the change in shape of the part to move the panel in either direction. Thus, each of these examples can be used to maintain a high pressure differential across the nozzle throat during the sustain phase by decreasing the throat diameter as the rate of propellant combustion, and accordingly the mass flow, drops, or to intentionally lower the pressure differential across the nozzle in the transition from the boost phase to the sustain phase of the rocket flight.

Other configurations and modifications of various kinds that utilize and implement the novel features of this invention will be apparent to those skilled in the art.

In the appended claims, the words "a" and "an" are intended to mean "one or more," and the term "comprising" when preceding the recitation of a step or an element is intended to mean that the addition of further steps or elements is optional and not excluded.

What is claimed is:

1. A nozzle with a throat of variable cross-sectional area, said nozzle comprising:
    an internal wall defining a flow passage having a fore end, an aft end, a convergent section, and a divergent section, said convergent and divergent sections meeting at a throat plane, said internal wall comprising a surface of variable contour; and
    temperature-responsive means for varying the contour of said surface to provide said flow passage with a cross-sectional area at said throat plane that varies between a first cross-sectional area at a first temperature and a second cross-sectional area at a second temperature, said temperature-responsive means comprising a shape-memory alloy that undergoes a crystallographic transformation between said first temperature and said second temperature.

2. The nozzle of claim 1 wherein said internal wall comprises a plurality of surfaces of variable contour, and said surfaces are surfaces of structural components fabricated of said shape-memory alloy.

3. The nozzle of claim 1 wherein said internal wall comprises a plurality of surfaces of variable contour, and said surfaces overlap to a degree that varies with said variable contour.

4. The nozzle of claim 1 wherein said internal wall comprises a plurality of surfaces of variable contour, and adjacent surfaces are separated by a gap whose width varies with said variable contour.

5. The nozzle of claim 1 wherein said internal wall comprises a plurality of surfaces of variable contour, and said surfaces are surfaces of panels mounted to a shell, said panels having upstream edges that are fixed to said shell at said fore end and downstream edges that are free to move within said throat plane.

6. The nozzle of claim 1 wherein said internal wall comprises a plurality of surfaces of variable contour, and said surfaces are surfaces of panels mounted to a shell, said panels having upstream edges that are fixed to said shell at said fore end and downstream edges that are joined to said shell at said throat plane in a pivotal joint.

7. The nozzle of claim 1 wherein said internal wall comprises a plurality of surfaces of variable contour, said surfaces are surfaces of panels, and said shape-memory alloy is formed into structural members supporting said panels.

8. A nozzle with a throat of variable cross-sectional area, said nozzle comprising:

an internal wall defining a flow passage having a fore end, an aft end, a convergent section, and a divergent section, said convergent and divergent sections meeting at a throat plane, said internal wall comprising a plurality of surfaces of variable contour; and temperature-responsive means for varying the contour of said surface to provide said flow passage with a cross-sectional area at said throat plane that varies between a first cross-sectional area at a first temperature and a second cross-sectional area at a second temperature, said temperature-responsive means comprising a material that undergoes a phase transformation from solid at said first temperature to liquid or gas at said second temperature, and said surfaces being surfaces of panels that undergo a reduction in flexural strength upon rising in temperature from said first temperature to said second temperature.

9. The nozzle of claim 8 wherein said internal wall comprises a plurality of surfaces of variable contour, and said surfaces overlap to a degree that varies with said variable contour.

10. The nozzle of claim 8 wherein said internal wall comprises a plurality of surfaces of variable contour, and adjacent surfaces are separated by a gap whose width varies with said variable contour.

\* \* \* \* \*